Sept. 3, 1957 F. P. LA JUDICE 2,804,774
ROTOR BALANCE WHEEL
Filed April 5, 1956

INVENTOR.
FRANK LA JUDICE
BY
ATTORNEYS

United States Patent Office 2,804,774
Patented Sept. 3, 1957

2,804,774

ROTOR BALANCE WHEEL

Frank P. La Judice, Arlington, Tex., assignor, by mesne assignments, to the United States of America as represented by the Secretary of the Navy Application April 5, 1956, Serial No. 576,509

16 Claims. (Cl. 73—455)

This invention relates to means for balancing the main rotors of a helicopter.

Present methods of balancing usually include the static method. However, this method has its limitations since a draft free hangar is required and such hangars are not readily available in the field or on shipboard. In addition, the static balance system is not a true balance for dynamic conditions.

On the other hand, in the dynamic balance tests now in use, removal of the rotor blade is usually necessary for setting up on the balance machine and such removal is a tedious task even under ideal conditions.

Furthermore, the initial balance, static or dynamic is, as a general rule, not permanent since unbalance errors are introduced over a period of time such as the taking on of a permanent set by the blades, and the additional absorption of moisture of one blade over another.

The instant invention overcomes these difficulties by providing a simple, inexpensive, dynamic balance device for helicopter rotors indicating the heavy blade or any chordwise balance condition. The device can be mounted permanently on the rotor mast giving an indication of the dynamic conditions of the rotor system at all times. In this way all the drawbacks of the present day dynamic balancing methods are eliminated while the deficiencies of the static systems are likewise removed.

The object of this invention therefore is a device which gives a true indication of dynamic balance of a rotor system at all times.

A further object of this invention is a balance device which is the essence of simplicity, inexpensive to manufacture and to maintain, and can be used at any time and under any adverse conditions.

A still further object of this invention is a device which eliminates the removal of the rotor for dynamic balance testing of such rotor.

Another object of this invention is the elimination of the need for static balancing of a rotor system.

Figure 1:
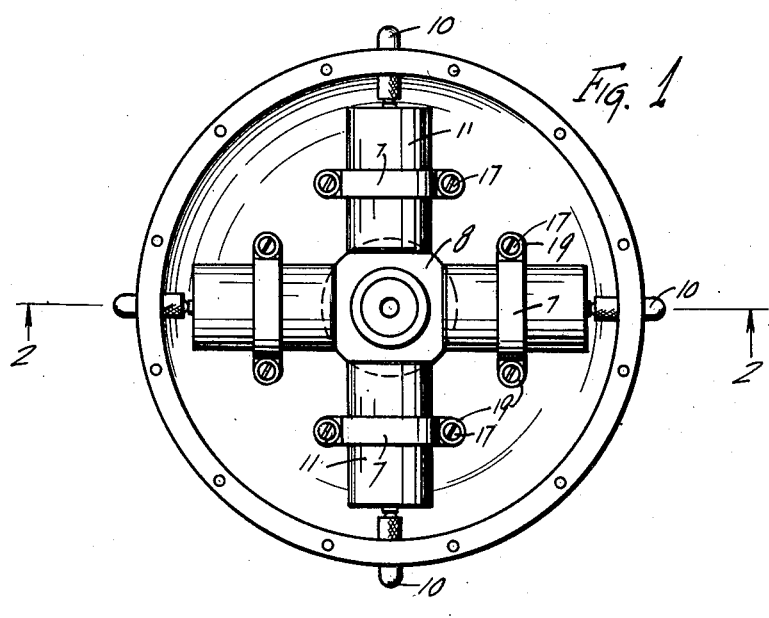
Figure 2:
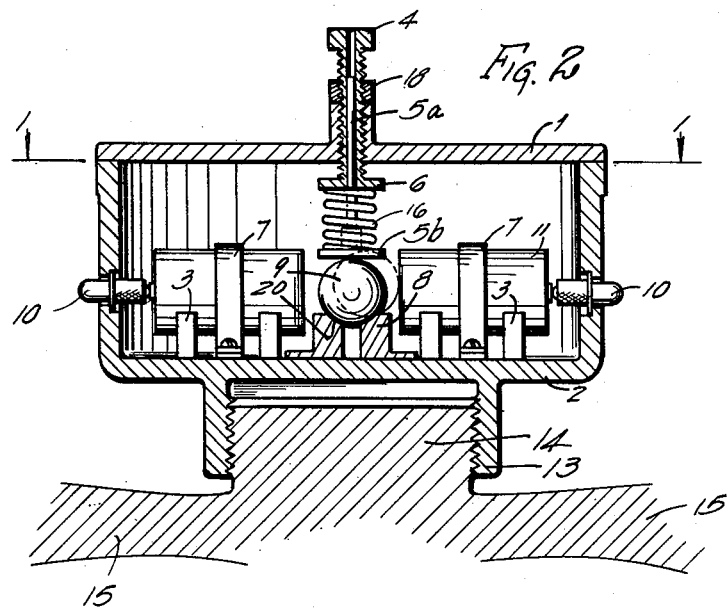

Other objects and advantages will be readily apparent to those skilled in the art from a reading of the specification and an examination of the drawings wherein, Figure 1 is a top view of the dynamic balance indicator of the instant invention with the top cover removed, and Figure 2 is a cross-sectional view along lines 2—2 of Figure 1.

The indicator comprises a casing 2 having a circular base plate and a tubular side. Mounted within the casing is a cylindrical ball retainer 8 having a V-shaped or conical seat 20 on its top side to accommodate a steel ball 20. A cover 1 secured to the tubular side of the casing has a threaded port in line with the ball 9 and retainer 8. Threaded into the port is an adjuster 4 at one of which is mounted a washer 6. A piston assembly 5 has a piston rod 5a slidable in a longitudinal bore in the adjuster 4 and washer 6, at the end of which rod is secured a plate 5b. A spring 16 bears against both the washer 6 and the plate 5b.

At each of four cardinal points of the ball and seat is mounted a battery 11 upon a pair of cradles 3 and secured to the floor of the casing 2 by a saddle 7, washer 19, and bolt 17 screwed into the floor.

In the tubular side wall of the housing 2 opposite the nipple of each battery is mounted a light bulb 10. The bulbs may be of different colors for better indication purposes.

Extending from the outside floor surface of the housing is a cylindrical rotor adapter 13 having a female thread therein. The mast of rotor 14 has a matching male thread for the adapter and also has the rotor blades 15 extending outward as is well known.

*Operation*

The adapter 13 and the entire indicating unit are screwed to the matching male threaded surface of mast 14 and each of the dry cells 11 is adjusted to be parallel to one of the rotor blades 15; thus, since each of the blades 15 is at one of the cardinal points, the battery cells will also be at the same cardinal points. It is understood, of course, that once the parallel adjustment is made, the indicator housing may be locked to the mast in any convenient manner. It is also understood, that if a two-bladed rotor is used, two of the dry cells will be in line with the blades and two will be in a line 90° from the longitudinal center line of the blades. On the other hand, if a 3 bladed rotor is used, only three cells are used, with each cell being parallel to the longitudinal center line of one of the blades.

When the mast is spinning and no unbalance condition exists, ball 9 remains centered on its conical seat 20 and the light bulbs remain dark thus indicating a balanced condition. When an unbalance condition exists, the ball will ride off the seat and remain off due to the centrifugal force action. While off the seat, the ball will come in contact with either one of the dry cells or two of the cells, thereby completing the light circuit and the associated light bulb or bulbs will be illuminated indicating which side or sides are out of balance. When the out-of-balance condition is compensated for, the ball will once again ride in the center of its seat in retainer 8. Each of the bulbs, as noted before, may be of a different color to aid in indicating which side is out of balance.

The sensitivity adjuster 4 varies the compression of spring 16 thereby altering the sensitivity of the ball with respect to unbalanced conditions. At a rated speed of the mast, the spring can be adjusted to require a certain amount of inch pound moment or impulse to throw the ball off center.

Although this indicator has been used specifically for a helicopter rotor, it is understood that there are many other uses of the indicator in rotating devices having a similar dynamic unbalance problem as the instant rotor; thus many modifications, variations and special uses of the present invention are possible in the light of the above teachings. It is therefore to be understood that within the scope of the appended claims the invention may be practiced otherwise than as specifically described.

What I claim is:

1. In a helicopter, a rotor having at least two blades attached thereto, a balance indicator mounted on said rotor, said indicator including a weighted ball and a seat for the ball such that when the rotor and blades are in dynamic balance the ball is on the seat and when they are in an unbalanced condition the ball is off the seat.

2. In a helicopter, a rotor mast having at least a pair of blades on either side of the mast, a dynamic balance indicator mounted on said mast, said indicator including a pair of dry cells mounted parallel to the axis of the blades, and a weighted ball between said dry cells.

3. The device of claim 2, further including a V-shaped seat for said ball.

4. The device of claim 2, further including a second pair of dry cells mounted on either side of said ball and at right angles to the first pair of dry cells.

5. In a helicopter, a rotor mast, a plurality of rotor blades attached to said mast, a dynamic balance indicator mounted on said rotor, said indicator including a ball, a seat for said ball centrally located in said indicator, and a plurality of dry cells, each cell mounted parallel to the longitudinal axis of one of the propellers, and said cells located around said ball.

6. In a helicopter, a rotor mast including a pair of blades on either side of said mast, a dynamic balance indicator on said mast, a plurality of multi-colored lights on said indicator, energizing means for said lights, each of said lights indicating a particular unbalance condition when lit.

7. In a helicopter, a rotor mast including a pair of blades on either side of said mast, a dynamic balance indicator mounted on said mast, a pair of dry cells parallel to the longitudinal axis of said blades, a second pair of dry cells at right angles to said first pair, a weighted ball, said cells grouped around said ball.

8. The device of claim 5, further including sensitivity means in contact with said ball.

9. The device of claim 5, further including a light bulb for each dry cell and wherein the bulbs are of different colors.

10. In a dynamic balance indicator, a casing, a weighted ball, a seat for said ball, said seat being centrally located in said casing, a pair of dry cells mounted on either side of said seat and ball.

11. In a dynamic balance indicator, a casing, a V-shaped seat in said casing, a weighted ball positioned on said seat, a group of dry cells mounted around said ball at the cardinal points thereof.

12. The device of claim 11, further including a light associated with each of said cells, said lights being multi-colored.

13. The device of claim 9, further including adjustable sensitivity means in contact with said ball.

14. In a dynamic balance indicator for a rotating unit, a casing, means on said casing for mounting the casing on said unit, a seat in said casing, a weighted ball located on said seat, a group of electrical energy sources located at the cardinal points of said seat and ball.

15. The device of claim 12, further including visual indicator means in operating relation with said energy sources, said visual indicator means indicating when the ball rides off the seat and contacts at least one of said energy sources due to dynamic unbalance of the rotating unit.

16. In a dynamic balance indicator, a casing, a seat located in said casing, a weighted ball positioned on said seat, open electrical circuit means located at each of the cardinal points of said seat and ball, each of said circuits being closed when the ball rides off the seat and contacts said particular open circuit means.

References Cited in the file of this patent

UNITED STATES PATENTS

| | | |
|---|---|---|
| 1,876,524 | Thearle | Sept. 6, 1932 |
| 2,350,077 | Smith | May 30, 1944 |
| 2,441,152 | Helleher et al. | May 11, 1945 |